July 10, 1956
F. GLASSFORD
2,753,888
SHOCK ABSORBER VALVE
Filed Sept. 7, 1950
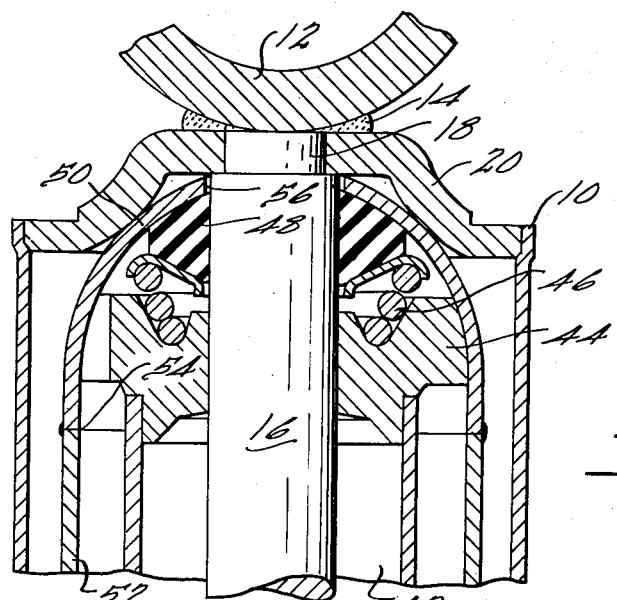
INVENTOR.
Fred Glassford.
BY
Harness and Harris
ATTORNEYS United States Patent Office 2,753,888
Patented July 10, 1956

2,753,888
SHOCK ABSORBER VALVE

Fred Glassford, Royal Oak, Mich., assignor to Chrysler Corporation, Highland Park, Mich., a corporation of Delaware Application September 7, 1950, Serial No. 183,567

1 Claim. (Cl. 137—513.7)

This application relates to valves, particularly check valves of the type used in conjunction with the permanently open base orifice of shock absorbers.

According to a feature of the present invention, a base valve for a shock absorber is provided and it includes a plug adapted to incorporate a thick-edged orifice, said plug being non-movable during valve operation. Hence valve response tends to be quick and, moreover, little or no inertia difficulties are encountered.

According to another feature, a shock absorber base valve is provided in which the valve spring for the valve is received at a predetermined location with a view to subjecting the valve to a predetermined preload and an accordingly uniform setting.

According to yet another feature, provision is made in the shock absorber base valve for disassembly of the entire unit without the necessity for grinding off spun flanges or otherwise permanently altering the structure of the base valve.

According to still another feature, a base valve is provided in which the assembly is press-fitted together, no tangs or spun flanges being utilized, and in which the valve spring is uniformly preloaded owing to the predetermined location for the body part thereof.

According to still a further feature, provision is made in the shock absorber base valve whereby the actual valve element does not necessarily distort and bend in operation but can actually move as a unit toward and away from its valve seat.

According to yet a further feature of the invention, a valve design has been incorporated in a shock absorber such that certain economies of manufacture and assembly made be realized and an overall simple construction result.

Other features, objects, and advantages will either be specifically pointed out or become apparent when for a better understanding of the invention, reference is made to the following specification taken in conjunction with the accompanying drawings in which:

Figure 1 is a longitudinal view in section of a shock absorber to which the instant invention has been applied;

Figure 2 is a cross section of the shock absorber in the vicinity of the piston; and Figure 3 is a plan view of the base valve.

With respect to the showing of Figure 1, the shock absorber 10 may be of the general type disclosed in the application Serial No. 166,958 filed June 8, 1950, which has matured into Patent No. 2,670,813, in the names of Ross E. Lewton and Donald T. Ball for Shock Absorber and Method of Damping. The upper eye 12 of such a shock absorber, as is particularly described in said Patent No. 2,670,813, is suitably held as by welding 14 to a piston rod 16 having a reduced portion 18. Reduced portion 18 carries a dust shield 20 of the usual type. At the lower end piston rod 16 is provided with a threaded portion 22 and a nut 24 for securing thereto a piston 26. Piston 26 is provided adjacent its skirt 28 with a plurality of open-ended passages 30 of relatively small dimensions in spaced relationship around the base of the piston. Inwardly of the row of passages 30 is a row of larger passages 32 open-ended at their lower end and mutually in communication with one another through an annular groove 34 in the top of the head of the piston. Annular groove 34 is controlled by a laminated valve 36 which is adapted to flex toward and away from the valve seat. Pressure tube 38 of the shock absorber defines a working cylinder divided by the piston 26 into a lower or jounce chamber 40 and an upper or rebound chamber 42. Closing the end of the rebound chamber 42 and received in pressure tube 38 is a piston rod bearing 44 accommodating the end of a compression spring 46. A piston rod seal 48 is compressed between the compression spring 46 and a hemispherical dome 50 of the reservoir tube 52. Dome 50 and reservoir tube 52 are suitably connected along their common edges at 54 as by welding, spinning, or riveting. Dome 50 is provided with an enlarged opening 56 which can accommodate reciprocal movement of piston rod 16 and yet at the same time retain the seal 48 for the rod within the outer casing for the shock absorber. Reservoir chamber 57 between pressure tube 38 and reservoir tube 52 is provided with a suitable baffle 58 tending to prevent aeration of the shock absorber fluid. A cap 60 for pressure tube 52 is suitably welded thereto at 61 and is further welded as at 62 to the lower eye 64 for the shock absorber. Between upraised portions 65 in cap 60 are formed passages such as at 66 providing communication between the reservoir 57 and a base valve 70 on the one hand and the jounce chamber 40 on the other. Base valve 70, which controls flow of fluid between the jounce chamber and the reservoir, will be later set forth in more particular detail.

In Figure 2, the piston 26 will be seen to have an outer row of open-ended small passages 30 surrounding an inner row of relatively larger passages 32, which latter passages are adapted to be controlled by the laminated valve 36 previously described.

For a complete explanation of the operation of the shock absorber of the type 10, reference may be made to the said copending application Serial No. 166,958 of Lewton and Ball. Briefly stated, as the upper and lower eyes 12 and 64 are moved toward one another, the volume of fluid displaced in the working cylinder defined by pressure tube 38 is equal to the volume of the piston rod 16 introduced through the end of the shock absorber. Fluid volume in terms of the piston rod volume then is necessarily handled by the base valve 70 for suitable passage through passage 66 into the reservoir 57. Viewed in another way, it will be seen that as the jounce chamber 40 diminishes in size, that portion of the fluid in the jounche chamber equal to the volume of the piston rod introduced in the shock absorber, is transmitted through base valve 70. The balance of the body of fluid in jounce chamber 40 is forced through the open-ended piston orifices 30 at an appropriate rate such that the rebound chamber 42 is continualy kept full of fluid. At an advanced rate of movement of the eyes 12 and 64 toward one another, the laminated valve 36 will be caused to lift progressively off its seat and will thus prevent the pressure in jounce chamber 40 from becoming excessive by permitting some slight additional fluid to pass from below the piston through valve-regulated passages 32 to above the piston. When eyes 12 and 64 start to separate relative to one another, inasmuch as piston rod 16 is being withdrawn from the shock absorber, a body of fluid must be withdrawn from reservoir 57 and through base valve 70 equal to the volume of piston rod 16 withdrawn. The fluid immediately trapped above the piston in rebound chamber 42 must at the same time make its way from above the piston to below the piston solely through the open-ended passages 30. Laminated valve 36 at the same time tends to close the annular recess 34 and prevent any fluid from passing through passages 32.

As particularly regards base valve 70, the valve body has an annulus 72 having at the base thereof a web 76 provided with one or more suitable openings 79 therethrough and connected to an upstanding central part 74. Annulus 70 is provided with a valve seat 78 which generally surrounds the one or more openings 79 in web 76. Upstanding part 74 is formed with an outer cylindrical surface 80 about which a valve element 82 may move up and down. At its outer portions valve element 82 rests on valve seat 78 and is provided with a central opening 84 slidably received on the cylindrical surface 80 of upstanding part 74. Upstanding part 74 is provided at its upper end with a shoulder 86 and a central bore 88. Received in bore 88 by a press fit is a plug 90 formed with an elongated straight fluid passage 92. Fluid passage 92 may be chamfered at either end as at 93. Plug 90 has a shoulder portion 94 which opposes the shoulder 86 on upstanding part 74 to define an intervening space in which is received a resilient member 96 aiding in control of valve element 82.

In Figure 3, resilient element 96 is held by the shoulder portion 94 of plug 90 at a predetermined location dependent upon the position of shoulder 86 formed on the inner part 74. Shoulder 86 may be machined to close tolerances as respects valve seat portion 78 of the base valve assembly and hence the degree of preloading of spring 96 may be accurately determined. Resilient member 96 is provided with one or more radiating spring fingers 98 having an inner part held against relative movement between the shoulders 86 and 94 just described, and an outer portion 102 which resiliently presses against valve element 82. In order that during the shock absorber stroke in which the eyes 12 and 64 move toward one another the compression chamber will be continually filled, the number and proportions of the open-ended passages 30 on piston 26 is correlated to the dimension of the single passage 92 provided in the plug 90 for the base valve 70. Such correlation is more completely brought out in the aforesaid copending Lewton et al. application Serial No. 166,958. As previously pointed out, during movement of the eyes 12 and 64 toward one another, the passage in plug 90 must handle that portion of the body of fluid in jounce chamber 40 equal to the volume of the piston rod 16 being introduced into the shock absorber. The balance of the fluid in jounce chamber 40 must be accommodated by the passages through piston 26. During the shock absorber stroke in which eyes 12 and 64 are separated, the body of fluid trapped in compression chamber 42 must all be transferred through open-ended passages 30 on the piston and no resistance of any consequence is offered by base valve 70. During these latter circumstances when eyes 12 and 64 separate, valve element 82 is lifted against the resistance of spring fingers 98 off the valve seat portion 78 to provide relatively free flow of fluid from reservoir 57 into jounce chamber 40. Inasmuch as a few thousandths of an inch clearance is provided between the annular inner margin 84 of valve element 82 and the outer cylindrical surface 80 of upstanding part 74, the valve element 82 may be shifted bodily upward along upstanding part 74 without bending or otherwise distorting appreciably. A smooth and simple action involving little or no resistive effect thereby results. The relatively marked length to diameter ratio of the passages 30 and the passage 92 has been found to offer considerable advantage in proper shock absorber operation. The length of passage 92 necessitates a rather extensively long plug 90, which desirably does not move with the check valve 82. It is to be noted in the instant application that check valve 82 moves freely bodily upwardly between the respective planes of the valve seat portion 78 and the shoulder portion 86 and without the corresponding movement of any other parts of the base valve save the tips of the spring fingers 98.

Variations within the spirit and scope of the invention described are equally comprehended by the foregoing description.

What is claimed is:

In a shock absorber, a base valve construction comprising a valve body, said body having a central sleeve-like part defining a longitudinally extending internal opening and having a uniform cylindrical outer surface, a plurality of flow passages through the body around said sleeve-like part, a plug press-fitted into said opening having a shoulder adjacent one end of said sleeve-like part, said plug extending through the opening and being provided with a longitudinally extending liquid conducting passage, said passage being open at both ends of the plug, a member arranged so as to provide a plurality of curved spring fingers radiating from a flat annular central portion transversely with respect to said sleeve-like part, the central portion of said member being clamped at the base of the fingers between said adjacent shoulder and said end of the sleeve-like part, said valve body having means forming an annular valve seat arranged in radially spaced relationship with respect to said sleeve-like part and in general adjacency to said spring fingers, and a valve element disposed between the tips of the spring fingers and the valve seat aforesaid, said valve element being adapted to be urged into a first limiting position of sealed engagement with said valve seat for preventing liquid from flowing past the valve element and into the space between said valve seat and sleeve-like part into said plurality of passages and from bypassing the liquid passage in the plug, said valve element comprising a disk provided with an opening embracing said sleeve-like part of the valve body and slidable therealong as the valve element moves from said first limiting position to a second limiting longitudinal position, said first and said second limiting positions being respectvely defined by the planes of said valve seat and said one end of the sleeve-like part.

References Cited in the file of this patent
UNITED STATES PATENTS

| | | |
|---|---|---|
| 870,659 | Ackerman | Nov. 12, 1907 |
| 1,240,461 | Leinert | Sept. 18, 1917 |
| 1,785,893 | Elsey | Dec. 23, 1930 |
| 1,900,736 | Richardson | Mar. 7, 1933 |
| 2,023,609 | Nelson | Dec. 10, 1935 |
| 2,087,451 | Rossman | July 20, 1937 |
| 2,138,513 | Rossman et al. | Nov. 29, 1938 |
| 2,183,003 | Becker | Dec. 12, 1939 |
| 2,390,527 | Flint | Dec. 11, 1945 |
| 2,430,427 | Katcher | Nov. 4, 1947 |
| 2,537,491 | Thornhill | Jan. 9, 1951 |
| 2,206,630 | Rossman | Aug. 12, 1952 |